April 23, 1957 C. BENNETT ET AL 2,790,136
POWER TRANSMISSION
Filed Dec. 8, 1955 2 Sheets-Sheet 1

INVENTORS
CLARENCE BENNETT
LESTER W. BUECHLER
BY
Clement J Paynokas
ATTORNEY

INVENTORS
CLARENCE BENNETT
LESTER W. BUECHLER
ATTORNEY

United States Patent Office 2,790,136
Patented Apr. 23, 1957

2,790,136

POWER TRANSMISSION

Clarence Bennett, Lemay, and Lester W. Buechler, Kirkwood, Mo., assignors to Vickers, Incorporated, Detroit, Mich., a corporation of Michigan Application December 8, 1955, Serial No. 551,905

13 Claims. (Cl. 323—89)

This invention relates to power transmission and more particularly to magnetic amplifiers.

One of the many types of magnetic amplifiers is the self-saturating bridge. Such amplifiers have a pair of adjacent saturable reactor branches connected at one end to a common A. C. terminal, the other ends of the branches being connected across the load diagonal of the bridge. Each of the branches includes a one-way valve connected in series with the impedance or power winding of a saturable reactor to provide self-saturation in the well-known manner. The one-way valves are oppositely related to conduct on alternate half cycles of an applied A. C. voltage.

Multiphase bridge type self-saturating magnetic amplifiers are subject to the following problem and condition which does not occur in single phase bridge type self-saturating magnetic amplifiers. In any conventional multiphase bridge type self-saturating magnetic amplifier, the rates of flux change and consequently the voltages across the reactors in adjacent reactor branches are considerably unbalanced, the unbalance being due in most part to the fact that each reactor is affected not only by the principal conduction current of its own branch, but also because it cyclically "sees" the voltage of the load due to the principal conduction currents of the other branches. Thus, at any instant the voltages across the reactors in adjacent reactor branches are necessarily unbalanced, resulting in an output loss which in some three-phase amplifiers reaches 20% or more.

Although the exact reason for this loss is not known for certain, it is believed that cyclic unbalance between the reactors in each pair of adjacent reactor branches produces a spinning neutral under which conditions the voltages between the vertices and the floating neutral of the voltage vector diagram of the polyphase bridge amplifier are considerably less than they would be if the neutral were symmetrically fixed, thus reducing the total output.

The reactors in adjacent reactor branches of a polyphase bridge can be locked in balanced phase opposition by connecting a resistor or a capacitor across the pair of reactors in adjacent branches to allow an even harmonic balancing current to flow. However, both expedients have serious side effects. Capacitors large enough to be effective, in many cases, cause resonance problems such as periodic oscillations, tripping action, and hunting. Resistors shorted across the reactor pairs introduce unwanted changes in the response time of the amplifier, and also introduce negative feedback. If the latter situation is remedied by inductively coupling the resistor across the two reactor power windings the time constant problem remains, and if the resistor is connected across the control winding an undesirable signal drain is introduced.

In accordance with the present invention the output of a polyphase bridge type self-saturating magnetic amplifier is substantially improved, without serious side effects, by means of a compensating loop circuit which includes an asymmetric device, and is inductively coupled to the two reactor power windings of adjacent reactor branches in opposed relation, the current conduction through the device being in a direction to generate mmfs in the reactors in aiding relation to the self-saturating flux. The current forced through the loop circuit by the differential voltages across the reactor power windings, due to the tendency of the flux in the inactive reactor to decay at a more rapid rate than the flux build-up in the active reactor, opposes the more rapid flux decay tendency in the inactive reactor thus substantially equalizing the rates of the flux changes in the two reactors thereby to substantially balance the voltages thereacross and lock the reactors in proper phase for greater output.

It is therefore an object of the present invention to provide a new and useful magnetic amplifier circuit.

Another object of the present invention is to provide means for increasing the output of a polyphase bridge type self-saturating magnetic amplifier.

Another object of the present invention is to improve a polyphase bridge type self-saturating magnetic amplifier by balancing the reactors in adjacent reactor branches with circulating current forced through an asymmetric circuit loop which inductively includes the power windings of the two reactors in opposed relation.

Another object of the present invention is to provide means for increasing the gain of a polyphase bridge type self-saturating magnetic amplifier.

A further object of the invention is to improve a polyphase bridge type self-saturating magnetic amplifier by means of a loop path which includes a unidirectional device and windings inductively related to the two reactor power windings of adjacent reactor branches in opposition.

Further objects and advantages of the present invention will be apparent from the following description, reference being had to the accompanying drawings wherein a preferred form of the present invention is clearly shown.

Figure 1:
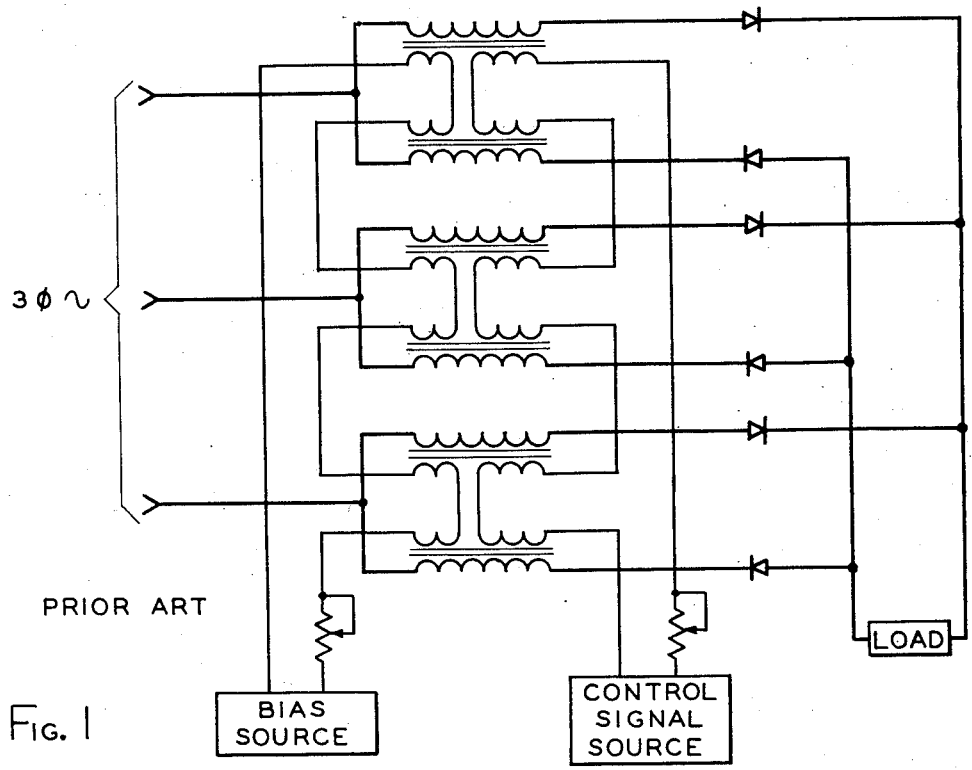
Fig. 1 is a schematic diagram of a conventional three-phase bridge type magnetic amplifier well known in the prior art.

Referring now to Fig. 1 which shows a polyphase bridge magnetic amplifier of the prior art, each power input terminal is connected to a pair of self-saturating reactor branches whose other ends are connected across the load diagonal of the bridge. Each reactor branch being a conventional half-wave self-saturating reactor circuit, includes the usual one-way valve connected in series with the power winding of a saturable reactor. The saturable reactors are provided with control windings which may be energized with an adjustable control signal, thereby to adjust the output of the amplifier.

Figure 2:
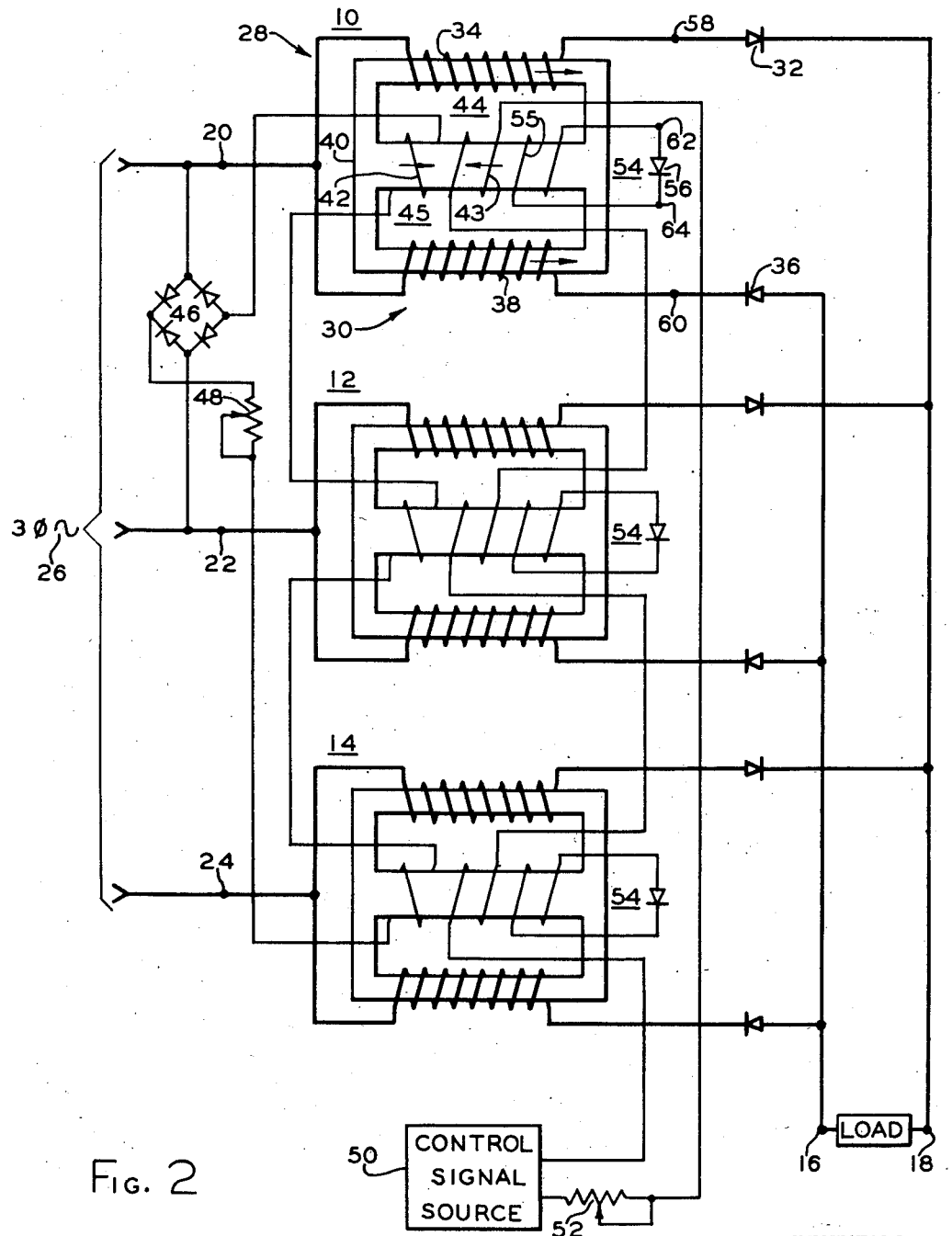
Fig. 2 is a schematic diagram of a polyphase bridge type magnetic amplifier embodying features of the present invention.

According to the present invention, a bridge type self-saturating magnetic amplifier circuit such as the type in Fig. 1 is considerably improved in the manner shown in Fig. 2, which shows the basic circuit of Fig. 1 modified by the addition of an asymmetric compensating circuit which extends the output range of the amplifier.

In Fig. 2 a three-phase bridge type self-saturating magnetic amplifier has three pairs 10, 12, and 14 of adjacent bridge branches. The branches in each pair are commonly connected together at one end to an A. C. input terminal of the bridge, the other ends of the branches being connected across the output terminals 16 and 18 of the bridge. For example, the pair 10 of adjacent branches is connected at one end to an A. C. input terminal 20. The adjacent branches in the pair 12 are connected to an A. C. input terminal 22, and the pair 14 of adjacent branches are connected to an A. C. input terminal 24. The input terminals 20, 22 and 24 constitute the power input diagonals of the bridge when taken in the following association: 20 and 22 forming one diagonal, 22 and 24 a second diagonal, and 20 and 24 a third diagonal. The output terminals 16 and 18 constitute the load diagonal of the bridge. Input terminals 20, 22 and 24 are connected to a source 26 of three-phase alternating current.

Each of the pairs of adjacent branches being similar, only one pair, for example pair 10, need be described. Pair 10 includes the adjacent branches 28 and 30, each of which has connected therein a one-way valve in series with the power winding of a saturable reactor. In branch 28 the one-way valve is at 32 and the reactor power winding is at 34, while in the branch 30 the one-way valve and the winding are indicated at 36 and 38, respectively. With respect to the applied supply voltage or to any common point in the circuit, for example terminal 20, the valves 32 and 36 are oppositely poled, that is, they are reversely related to each other. One-way valves of any suitable type may be employed, for example metallic rectifiers such as selenium cells. For convenience valves 32 and 36 will hereinafter be referred to as the power valves.

Although the windings 34 and 38 may be carried on separate magnetic cores, they are shown in the illustrated embodiment as being wound on the respective outer legs of a three-legged saturable magnetic core 40, which also carries on its center leg a bias winding 42 and a control winding 43. Preferred core materials for magnetic amplifiers have narrow, substantially rectangular, dynamic hysteresis loops. Although the reactor power windings of both branches are shown on a single three-legged core and employ a common control and a common bias winding, it is well known that this arrangement is in effect two distinct reactors, one associated with one branch and including one power winding and one half of the core, while the other reactor is in the other branch and includes the other half of the core and the second power winding. Thus, the reactor in branch 28 may be generally indicated at 44 while the reactor in branch 30 may be indicated at 45.

Bias current may be supplied to the bias windings of all the reactors in the respective pairs from any suitable source, for example, a rectifier 46 whose input is connected across one of the phases of the A. C. supply source 26 and whose output is connected through an adjustable impedance 48 to all of the bias windings. All of the control windings 43 of the reactors in the respective pairs are connected to a source of control signals 50 through an adjustable impedance 52. The signal source 50 may be unidirectional current from a battery, a generator, a detector, the output of another amplifier, or any other suitable source. As is well known, with the control coils properly oriented and the control signal properly phased, the control signal may be alternating current from any suitable source. Likewise, the current to the bias windings 42 may also be properly phased alternating current.

The circuit thus far described is conventional and its operation is well known and will not be gone into with great detail. Considering the operation of one particular pair of branches, for example pair 10 (branches 28 and 30), the operation is as follows. During one half cycle of the applied supply voltage from the source 26, for instance the half cycle during which valve 32 is conductive and valve 36 is nonconductive, current will flow from the alternating current supply source 26 through the reactor winding 34, valve 32, the load, and back to the source 26 through one or both of the other phase conductors depending on the portion of the half cycle being considered. On the opposite half cycle, the valve 36 is conductive and current will flow from one or both of the other phase conductors through the load in the same direction and then through valve 36 and reactor power winding 38 back to the source 26. The load current flow depends on the impedance of the reactors which in turn is dependent upon the premagnetization or the degree of magnetic saturation of the reactor cores. The degree of magnetization of the core of a particular reactor during the nonconductive period of its associated power valve controls the firing angle of the reactor section involved. During this critical period the core saturation may be decreased or increased as desired by adjusting the amplitude or sense, or both, of the control current supplied to the control coil 43. The direction of current through any winding which produces mmfs tending to drive the amplifier up, that is mmfs in aiding relation to the fluxes of self-saturation, shall be referred to as the saturating direction and any mmfs produced by such current shall be referred to as saturing mmfs.

Figure 3:
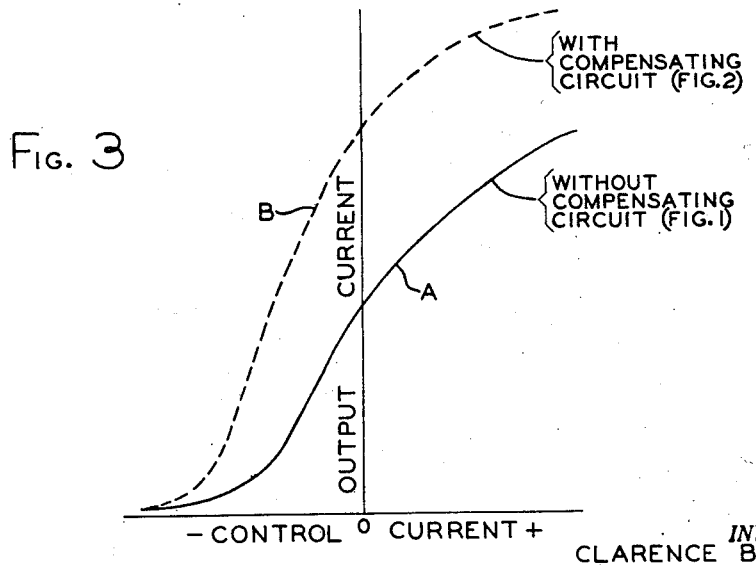
Fig. 3 is a chart with comparative output curves showing improvement in output gained by the present invention.

For a given set of parameters the circuit thus far described will have a particular control characteristic for a given supply voltage, for example, the control characteristic represented by Curve A in the chart of Fig. 3 wherein the X axis represents control current and the Y axis output current. For the same set of given parameters and conditions the output of the amplifier is increased, for example to the position represented by the upper end of the dashed Curve B, by adding, in accordance with the present invention, to the circuit thus far described, similar compensating circuits 54 in each of the pairs 10, 12 and 14 of adjacent reactor branches. Each compensating circuit is a series loop which includes an asymmetric link and is inductively related to the reactor power windings of adjacent reactor branches, the asymmetric link being poled to pass current mainly in the saturating direction, and the inductive coupling between the power windings and the loop circuit being such that the respective power windings have opposite inductive effects on the loop circuit.

Again considering the pair 10 of adjacent arms for explanatory purposes, it will be seen that compensating circuit 54 is a series loop including a winding 55 inductively coupled to the power windings 34 and 38 in opposition with respect to fundamental frequency voltages, and an asymmetric link 56 connected across the winding 55 and poled to pass current through the winding 55 in the saturating direction, the frequency referred to being related to the frequency of the supply voltage. Asymmetric link 56 may be, for example, a one-way valve such as a metallic rectifier, for example a selenium cell.

Under these conditions the mmfs produced in the reactor core sections by the circulating current in the compensating loop circuit 54 is in the same direction as the mmfs produced in the cores by the load current flowing in the forward direction of each power valve during its conductive or active half cycle. To state it briefly, the valve 56 is poled to pass current through the compensating circuit in the saturating direction.

Although the winding 55 is shown in the drawing as a single winding on the center leg of the three-legged core, it may be split, one half being wound on one outer leg of the core, the other half on the other outer leg, the split sections being connected in series opposition in the loop circuit. In either case, the winding 55 is inductively coupled to the power windings 34 and 38, which power windings are oppositely related in this inductive relation and have opposed fundamental frequency effects on the winding 55. In the case where winding 55 is on the center leg, the fundamental frequency fluxes due to the voltages across the power windings oppose each other in the center leg and the voltage induced in winding 55 on the center leg includes a voltage which is a function of the resultant of the series opposed fundamental voltage variations across the power windings. In analysis by superposition, it is proper to separate the fluxes of both reactor sections threading through the common leg and to refer to voltages induced by each. Thus instead of referring to a resultant flux inducing a voltage, it is just as proper, for analysis, to refer to the respective flux components as inducing oppositely related fundamental frequency voltages in the winding 54 providing a resultant which is the differential of these voltages. In the case where the winding 55 is split, one half wound on one outer leg of the core and the other half wound on the other outer leg, the fundamental frequency voltages induced in the two split sections of the winding 55 by the respective reactor power windings are opposed and substantially cancelled whereby the compensating circuit is subjected to the differential or resultant of the power winding voltages. The fundamental frequency quantities at any instant in both reactors are due to the flux build-up in one reactor while the flux is decaying in the other. While the fundamental flux produced by the load current is building up in the reactor of one branch of a pair of adjacent branches, it is decaying in the reactor of the other branch of that pair of branches, and the compensating winding 55, whether it be on the center leg as illustrated or in split form on the outer legs, is always subjected simultaneously to the flux decay of one reactor and to the flux build-up in the other reactor. The net result is that the compensating circuit 54 is always subjected to the differential of the instantaneous flux conditions of both reactors.

As hereinbefore stated the rates of flux change and consequently the voltages of the respective reactor sections of the adjacent reactor branches 28 and 30, are more nearly balanced in opposite phase by the circulating current forced through the compensating loop 54 by the voltage differential between the reactor sections associated with the respective windings 34 and 38. By the expression "balanced in opposite phase" is meant that at any instant the fundamental voltages across the two reactor windings 34 and 38 are equal and opposed with respect to the common connection of the windings at the input terminal 20 and across the points 58 and 60. The instantaneous sign of these voltages is the same for both windings at the common terminal 20 and is also the same for both at points 58 and 60. Thus, if the fundamental voltages across the power windings were exactly equal and symmetrical there would be no fundamental voltage across points 58 and 60. Fundamental frequency quantities in the reactors of adjacent branches are in opposition tending to free the compensating circuit of fundamental frequency currents. For example, the windings 34 and 38 being included inductively and in series opposition in the compensating circuit 54, the fundamental frequency voltage across winding 34 is in opposition to the fundamental frequency voltage across winding 38, making the compensating circuit 54 substantially free of fundamental frequency current. It was found that, in actually tested polyphase circuits, the compensating circuits 54 effected as much as 20% and more increase in the amplifier output.

In addition to its use in the compensating circuit 54, the compensating winding 55 may be concurrently used as a control winding by connecting a source of control current across the points 62 and 64, especially in the case where this control current is in the saturating direction, in which case the valve 56, because of its specific orientation, will not be a drain on the control current source.

Even if only one pair of adjacent reactor branches in a polyphase bridge magnetic amplifier is equipped with the compensating circuit the amplifier is improved by an increase of the output. For example, if the pair 10 of adjacent branches has a compensating loop circuit 54, and the other pairs 12 and 14 do not have the compensating circuits, there is still some advantage gained and an increase of total amplifier output.

The arrows under the respective power windings show the relative mmf directions of those windings during the conductive or active periods of the respective power valves associated therewith. The arrows under the other windings indicate the mmfs produced by those windings. For example, the mmfs of the bias windings oppose those of the control and of the power windings, thus indicating negative bias.

The turns ratio between the reactor power windings and the compensating winding 55 is not critical. In one practical example 600 turns on each power winding and 500 turns on the compensating winding gave excellent results.

It will be apparent from the curves of Fig. 3 that the compensating circuit 54 increases both the output and the gain of a polyphase bridge type self-saturating magnetic amplifier.

While the form of embodiment of the invention as herein disclosed constitutes a preferred form, it is to be understood that other forms might be adopted, all coming within the scope of the claims which follow.

What is claimed is as follows:

1. A three-phase bridge type self-saturating magnetic amplifier comprising a power input circuit, an output circuit, and a plurality of pairs of adjacent bridge branches, each branch including a saturable reactor element with a power winding and a one-way valve connected in series with the winding, the valves in each pair being reversely related, one end of both branches in each pair being coupled to the input circuit, the other ends of the branches in each pair being connected across said output circuit, each pair of adjacent bridge branches having an asymmetric loop circuit exclusively for that pair and including additional winding means inductively coupled to the reactor elements and to the power windings of said pair of adjacent branches, said winding means being responsive to the differential of the instantaneous flux conditions of the reactor elements of said pair of branches, said loop circuit being poled to permit current flow therethrough mainly in the saturating direction.

2. A polyphase bridge type self-saturating magnetic amplifier comprising a power input circuit, an output circuit, and a plurality of pairs of adjacent bridge branches, each branch including a saturable reactor with a power winding connected with a one-way valve for self-saturation, the valves in each pair being reversely related, one end of both branches in each pair being coupled to the input circuit, the other ends of the branches in each pair being connected across said output circuit, each pair of adjacent bridge branches having means for circulating current in said reactors of that pair of branches in response to the resultant voltage relations of those reactors, said means comprising a series loop circuit including a unidirectional device and additional winding means inductively related to said reactors of that pair of branches, said device being poled to pass current through said loop circuit in the saturating direction.

3. A polyphase bridge type self-saturating magnetic amplifier comprising a power input circuit, an output circuit, and a plurality of pairs of adjacent bridge branches, each branch including a one-way valve and a saturable reactor having core means and a power winding on the core means and connected to the one-way valve for self-saturation, the valves in each pair being reversely related, one end of both branches in each pair being coupled to the input circuit, the other ends of the branches in each pair being connected across said output circuit, and each pair of adjacent branches having an asymmetric loop circuit including additional winding means inductively related to said core means and power windings of that pair of adjacent branches and responsive to the differential of the instantaneous fluxes of said reactors of that pair of branches, said loop circuit being poled to allow current flow therethrough mainly in the saturating direction.

4. A three-phase bridge type self-saturating magnetic amplifier comprising a power input circuit, an output circuit, and a plurality of pair of adjacent bridge branches, each branch including a saturable reactor with a power winding and a one-way valve connected to the winding for self-saturation, the valves in each pair being oppositely poled, one end of both branches in each pair being coupled to the input circuit, the other ends of the branches in each pair being connected across said output circuit, and each pair of adjacent branches having a series loop circuit including a unidirectional device and additional winding means in an inductively related arrangement with the reactors of that pair of adjacent branches, means in said arrangement placing fundamental frequency quantities of the respective reactors of that pair of branches in opposition to each other with respect to the additional winding means whereby said loop circuit is substantially free of fundamental frequency current, said device being poled to pass current through the loop circuit in the saturating direction.

5. A polyphase bridge type self-saturating magnetic amplifier comprising a power input circuit, an output circuit, a plurality of pairs of adjacent bridge branches, each branch including a saturable reactor power winding and a one-way valve connected in series with the winding, the valves in each pair being reversely related, one end of both branches in each pair being coupled to the input circuit, the other ends of the branches in each pair being connected across said output circuit, and an asymmetric loop circuit including additional winding means inductively coupled to said power windings of a pair of adjacent branches in series opposition, said asymmetric loop circuit being poled to permit current flow therethrough mainly in the saturating direction.

6. In a polyphase bridge type self-saturating magnetic amplifier having a plurality of power input terminals, an output circuit and a plurality of pairs of adjacent bridge branches, each branch including a saturable reactor with power winding connected in series with a one-way valve, one end of the branches in each pair being connected together to one of said terminals, the other end of said branches of each pair being connected across said output circuit, the combination therewith of a series loop circuit comprising additional winding means inductively coupled to the reactors and the power windings of a pair of adjacent branches and a one-way valve coupled across said winding means, said coupling relation being such that said winding means is subjected to the differential of instantaneous flux conditions of the reactors in that pair, said last valve being poled to pass circulating current through said loop circuit in the saturating direction.

7. In a polyphase bridge type self-saturating magnetic amplifier having a power input circuit, an output circuit, and a plurality of pairs of adjacent bridge branches, each branch including a saturable reactor with a power winding and a one-way valve connected in series with the winding, the valves in each pair being reversely related, one end of both branches in each pair being coupled to the input circuit, the other ends of the branches in each pair being connected across said output circuit, the combination therewith of an asymmetric loop circuit including additional winding means inductively coupled to said reactors of a pair of adjacent bridge branches, said loop circuit being responsive to the differential of the flux decay of one reactor in that pair and flux build-up of the other reactor in that pair, said loop circuit being poled to permit current flow therethrough mainly in the saturating direction.

8. In a polyphase bridge type self-saturating magnetic amplifier having a plurality of power input terminals, an output circuit and a plurality of pairs of adjacent bridge branches, each branch including a saturable reactor with a power winding connected with a one-way valve for self-saturation, the valves of each pair of branches being oppositely poled, one end of the branches in each pair being connected together to one of said terminals, the other end of said branches of each pair being connected across said output circuit, the combination therewith of a loop circuit including additional winding means in an inductive coupling arrangement with said reactors of a pair of adjacent bridge branches, said loop circuit also including a unidirectional device connected in series with said winding means, said device being poled to pass circulating current through said loop circuit in the saturating direction, and means in said coupling arrangement placing fundamental frequency quantities of the respective reactors of said arrangement in opposition to each other with respect to the additional winding means whereby said loop circuit is substantially free of fundamental frequency currents.

9. In a polyphase bridge type self-saturating magnetic amplifier having a plurality of power input terminals, an output circuit and a plurality of pairs of adjacent bridge branches, each branch including a saturable reactor with a power winding connected to a one-way valve for self-saturation, the valves in each pair of branches being oppositely related, one end of the branches in each pair being connected together to one of said terminals, the other end of said branches of each pair being connected across said output circuit, the combination therewith of means for circulating current through the reactors of a pair of adjacent branches in the saturating direction and in response to a net voltage which is a function of the differential of the instantaneous voltage relations across the power windings of said reactors of that pair of branches, said means comprising a series loop circuit including a unidirectional device and additional winding means inductively coupled with the last said power windings, said device being poled to pass circulating current through said loop circuit in the saturating direction.

10. In a polyphase bridge type self-saturating magnetic amplifier having a plurality of power input terminals, an output circuit and a plurality of pairs of adjacent bridge branches, each branch including a saturable reactor with a power winding connected in series with a one-way valve, the valves in each pair of branches being reversely related, one end of the branches in each pair being connected together to one of said terminals, the other end of said branches of each pair being connected across said output circuit, the combination therewith of a series loop circuit comprising a unidirectional device and additional winding means inductively coupled with the power windings of a pair of adjacent bridge branches, said power windings being opposed in said coupled relation with respect to voltages thereacross, said device being poled to pass circulating current through said loop circuit in the saturating direction.

11. A polyphase bridge type self-saturating magnetic amplifier comprising a power input circuit, an output circuit, a plurality of pairs of adjacent bridge branches, each branch including a one-way valve and a saturable reactor with a magnetic circuit and a power winding inductively coupled to the magnetic circuit and connected in series with the one-way valve for self-saturation, the valves in each pair being reversely related, one end of both branches in each pair being coupled to the input circuit, the other ends of the branches in each pair being connected across said output circuit, each pair of adjacent branches having a magnetic path which is common to said magnetic circuits of that pair and in which path fundamental fluxes produced by the respective power windings of that pair are opposed to each other, and each pair of adjacent branches having an asymmetric loop circuit exclusively for that pair and including additional winding means encircling said common magnetic path of that pair of adjacent branches, said asymmetric loop circuit being poled to permit current flow therethrough mainly in the saturating direction.

12. A three-phase bridge type self-saturating magnetic amplifier comprising a power input circuit, an output circuit, a plurality of pairs of adjacent bridge branches, each branch including a one-way valve and a saturable reactor with a magnetic circuit and a power winding inductively coupled to the magnetic circuit and connected in series with the one-way valve for self-saturation, the valves in each pair being reversely related, one end of both branches in each pair being coupled to the input circuit, the other ends of the branches in each pair being connected across said output circuit, each pair of adjacent branches having a magnetic path which is common to said magnetic circuits of that pair and in which path fundamental fluxes produced by the respective power windings of that pair are opposed to each other, and each pair of adjacent branches having a loop circuit exclusively for that pair and including additional winding means encircling said common magnetic path of that pair of adjacent branches and connected in series with a unidirectional device, said device being poled to permit current flow therethrough in the saturating direction.

13. A three-phase bridge type self-saturating magnetic amplifier comprising a power input circuit, an output circuit, a plurality of pairs of adjacent bridge branches, each branch including a saturable reactor power winding and a one-way valve connected in series with the winding, the valves in each pair being reversely related, one end of both branches in each pair being coupled to the input circuit, the other ends of the branches in each pair being connected across said output circuit, and each pair of adjacent branches having an asymmetric loop circuit exclusively for that pair and including additional winding means in an inductive coupling arrangement with said power windings of that pair of adjacent branches in which coupling arrangement the respective power windings have opposing fundamental frequency inductive effects on said winding means, said asymmetric loop circuit being poled to permit current flow therethrough mainly in the saturating direction.

No references cited.